United States Patent
Xu et al.

(10) Patent No.: US 10,693,853 B2
(45) Date of Patent: Jun. 23, 2020

(54) METHOD AND SYSTEM FOR POLICY ENFORCEMENT IN TRUSTED AD HOC NETWORKS

(75) Inventors: Gang Xu, Piscataway, NJ (US); Cristian Borcea, New Providence, NJ (US); Liviu Iftode, Princeton, NJ (US)

(73) Assignees: AT&T Intellectual Property I, LP, Atlanta, GA (US); New Jersey Institute of Technology, Newark, NJ (US)

( * ) Notice: Subject to any disclaimer, the term of this patent is extended or adjusted under 35 U.S.C. 154(b) by 1357 days.

(21) Appl. No.: 12/842,279

(22) Filed: Jul. 23, 2010

(65) Prior Publication Data

US 2012/0023550 A1 Jan. 26, 2012

(51) Int. Cl.
*H04L 29/06* (2006.01)
*H04W 84/18* (2009.01)

(52) U.S. Cl.
CPC ............ *H04L 63/08* (2013.01); *H04L 63/20* (2013.01); *H04W 84/18* (2013.01)

(58) Field of Classification Search
CPC ......... H04L 63/08; H04L 63/20; H04W 84/18
USPC ........................................ 726/1, 3; 380/247
See application file for complete search history.

(56) References Cited

U.S. PATENT DOCUMENTS

| | | | |
|---|---|---|---|
| 2005/0215234 A1* | 9/2005 | Fukuzawa et al. | ............ 455/411 |
| 2007/0199060 A1* | 8/2007 | Touboul | ............ 726/11 |
| 2008/0261580 A1* | 10/2008 | Wallentin et al. | ............ 455/418 |
| 2009/0168696 A1* | 7/2009 | Lindstrom et al. | ............ 370/328 |
| 2010/0290622 A1* | 11/2010 | Garcia Morchon | .. H04W 12/04 380/273 |

OTHER PUBLICATIONS

Minsky et al., "Unified Support for Heterogeneous Security Policies in Distributed Systems", Department of Computer Science, Rutgers University, USENIX Security Svmposium. Jan. 1998, 12 sheets.
Sailer et al., "Attestation-Based Policy Enforcement for Remote Access", CCS '04, Oct. 25-29, 2004, pp. 308-317.
Xu, et al., "Trusted Application-Centyic Ad-Hoc Networks", IEEE 2007, 10 sheets.

* cited by examiner

*Primary Examiner* — Ellen Tran
(74) *Attorney, Agent, or Firm* — Fay Kaplun & Marcin, LLP

(57) ABSTRACT

A non-transitory computer-readable storage medium storing a set of instructions executable by a processor. The set of instructions is operable to receive a request from a node to join a trusted ad hoc network. The set of instructions is further operable to authenticate the node to join the trusted ad hoc network. The authentication is performed based on a verification that the node will comply with a security policy of the trusted ad hoc network. The set of instructions is further operable to send, to the node, a verification that the trusted ad hoc network complies with the security policy. The set of instructions is further operable to add the node to the trusted ad hoc network.

19 Claims, 6 Drawing Sheets

METHOD AND SYSTEM FOR POLICY ENFORCEMENT IN TRUSTED AD HOC NETWORKS

BACKGROUND

Mobile ad hoc networking is used with increasing frequency for a variety of applications. Because mobile ad hoc networks lack standard choke points, such as firewalls or proxies, at which security policies can be enforced, these networks present security challenges not present in more traditional access point networks.

SUMMARY OF THE INVENTION

A non-transitory computer-readable storage medium stores a set of instructions executable by a processor. The set of instructions is operable to receive a request from a node to join a trusted ad hoc network. The set of instructions is further operable to authenticate the node to join the trusted ad hoc network. The authentication is performed based on a verification that the node will comply with a security policy of the trusted ad hoc network. The set of instructions is further operable to send, to the node, a verification that the trusted ad hoc network complies with the security policy. The set of instructions is further operable to add the node to the trusted ad hoc network.

A method includes receiving a request from a node to join a trusted ad hoc network. The method also includes authenticating the node to join the trusted ad hoc network. The authentication is performed based on a verification that the node will comply with a security policy of the trusted ad hoc network. The method also includes sending, to the node, a verification that the trusted ad hoc network complies with the security policy. The method also includes adding the node to the trusted ad hoc network.

A device includes a memory and a processor. The processor is configured to receive a request from a node to join a trusted ad hoc network of which the device is a member. The processor is further configured to authenticate the node to join the trusted ad hoc network. The authentication is performed based on a verification that the node will comply with a security policy of the trusted ad hoc network. The processor is further configured to send, to the node, a verification that the trusted ad hoc network complies with the security policy. The processor is further configured to add the node to the trusted ad hoc network.

DETAILED DESCRIPTION

Figure 1:
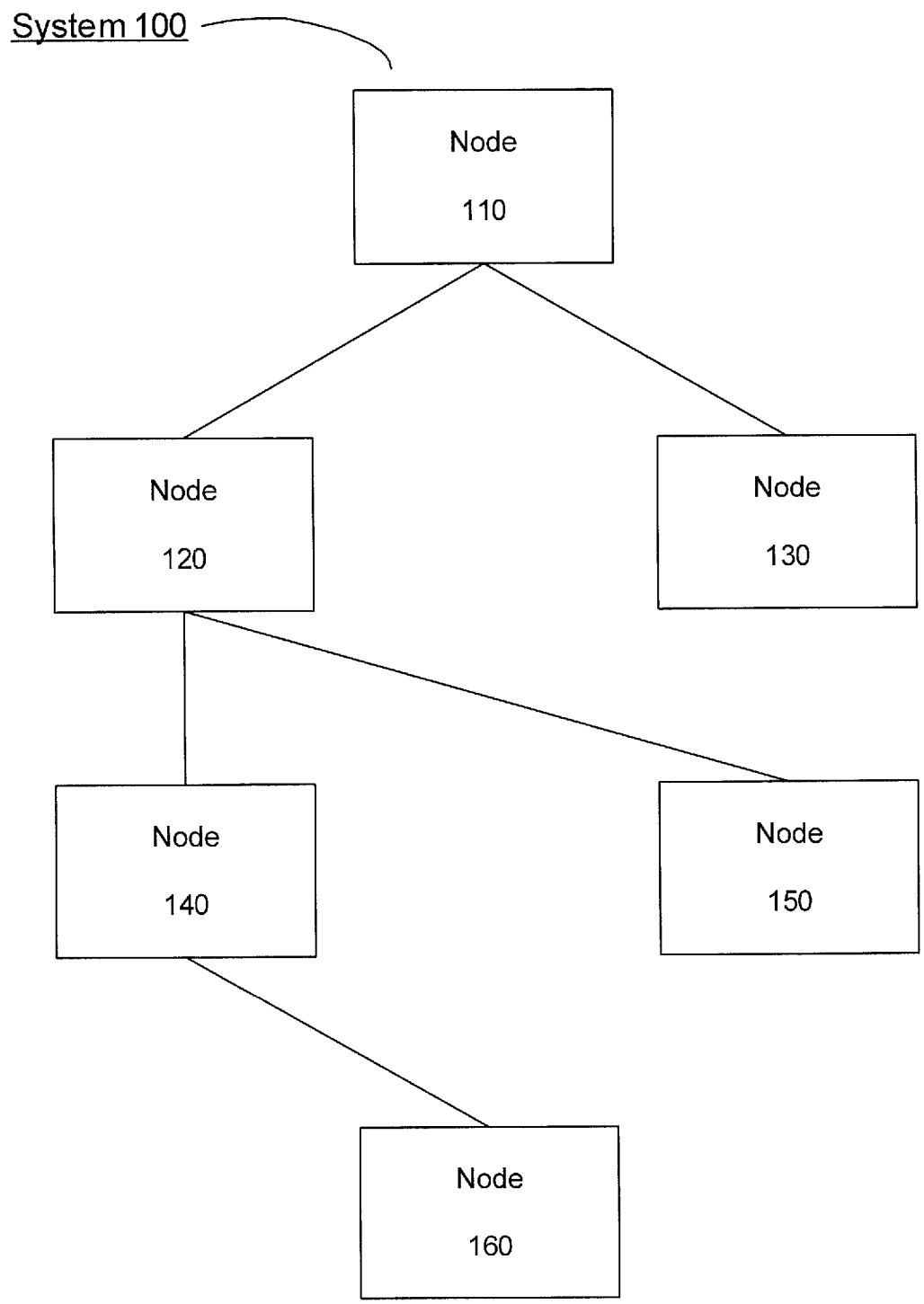
FIG. 1 shows an exemplary mobile ad hoc network.

The exemplary embodiments of the present invention may be further understood with reference to the following description and the appended drawings, wherein like elements are referred to with the same reference numerals. The exemplary embodiments describe methods and systems for providing security policy enforcement in mobile ad hoc networks ("MANETs").

As short-range wireless communications technologies have become more well-developed and mobile computing devices have become more prevalent, it has become more feasible to build real-world applications for MANETs. Such applications may include, for example, traffic monitoring and information-sharing in vehicular networks, as well as file sharing or multiplayer gaming in networks of smart phones or other mobile computing devices. As with any wireless technology, it is crucial for such network applications to provide for secure communication and proper collaboration among all participants.

To achieve this goal, communication policies governing interactions between participants must be defined and enforced. Typical Internet-based systems are not appropriate for MANETs for two reasons. First, such systems enforce policies at trusted "choke points" (e.g., firewalls, proxies, etc.), which do not exist in MANETs due to lack of infrastructure; placing such a choke point in a MANET is also difficult or impossible because paths between nodes change frequently due to mobility. Second, many existing methods aim to protect servers from unauthorized client access; this distinction does not exist in MANETs, as every node in a MANET can be a client and a server at the same time, and no individual participant is trusted more than another. Thus, the exemplary embodiments present a mechanism for enforcing communications policies in a MANET.

FIG. 1 illustrates an exemplary system 100 that may operate in accordance with the exemplary embodiments. The system 100 includes a plurality of nodes 110, 120, 130, 140, 150 and 160. The nodes 110-160 may include similar or differing hardware and operating software. Each of the nodes 110-160 may include hardware that enables ad hoc wireless communication (e.g., a WLAN interface) and may include a processor and a memory storing one or more software applications that may utilize a MANET, such as applications of the types described above. In the system 100 of FIG. 1, node 110 communicates with nodes 120 and 130; node 120 communicates with nodes 110, 140 and 150; node 130 communicates only with node 110; node 140 communicates with nodes 120 and 160; and node 150 communicates only with node 120. The lines shown between the nodes in FIG. 1 indicate these wireless communications. It should be noted that in a MANET, paths between nodes may change frequently, as nodes are mobile and may establish and lose links with other nodes over time; thus, it will be apparent to those of skill in the art that FIG. 1 represents a "snapshot" of a transient set of connection paths at a particular point in time.

The exemplary embodiments function by establishing "trusted tiers" among nodes within a MANET. A trusted tier is formed by a plurality of nodes that establish, among themselves, that each node within the tier will comply with a policy or policies in accordance with the nature of the application being executed by the nodes within the MANET. A trusted tier may include a tier key, which may be created by the node that establishes the tier, and is used to authenticate communications within the tier. In one example of a trusted tier, a group of nodes may route traffic in accordance with the Ad Hoc On Demand Distance Vector ("AODV") protocol. The AODV protocol is known to be vulnerable to wormhole attacks, and one way to defeat such attacks is to implement packet leashes; for example, one type of packet leash is a geographical leash that can ensure that the destination node for a packet is within a certain distance from the source node. In accordance with such a leash, replies received from a destination node that is further than an acceptable distance from the source node are deemed to be from a wormhole and discarded; thus, a trusted tier of nodes implementing AODV may all be required to comply with a policy embodying a geographical leash.

In another example, nodes may represent vehicles on a highway forming a MANET to exchange traffic information. In such a network, each node may simultaneously post queries, answer queries, receive responses, and forward queries. In order to share data fairly, such a network should ensure that each node responds to and relays the queries of other nodes, rather than simply initiating its own queries. Thus, a trusted tier of nodes in such a network may implement a policy that requires each node to serve or relay at least one request from other nodes after posting three queries of its own.

In a third example, nodes may be smart phones or other mobile computing devices playing an online game via a MANET. Players in such a game may be separated into two or more teams, with each player choosing to join one of the teams at the beginning of the game. To ensure fairness, the MANET might implement a policy that makes each node within the MANET free to join any of the teams, but unable to join a different team without first withdrawing from its current team.

As described above, in a MANET executing an application such as these, each node abides by the policy or policies. Further, it will be apparent, because of the lack of trusted choke points in a MANET, that such policies are enforced at each node of the network. Additionally, policies may be related; for example, a gaming policy may require that a routing policy has already been enforced. Thus, a group of nodes may form a multi-tier network in which each tier independently enforces its own accompanying policy.

Policies may be enforced by means of a trusted agent ("TA"), which prevents policies from being compromised. Each node in a MANET may include a trusted agent. When a node joins a trusted tier, its trusted agent helps establish trust between itself and the trusted tier, and vice versa, by proving the execution of the trusted agent, a trustworthy policy-enforcing software component (also known as a "policy enforcer"), and the appropriate policy. The trusted agent further ensures that the integrity of the agent, the enforcer, and the policy will not be compromised. This is possible because the trusted agent is part of the operating system kernel, and guarantees the integrity of the kernel and all programs involved in policy enforcement. Therefore, the trusted agent can foil attacks, including those launched by local users, to tamper with the enforcer or with the policy being enforced. If any of the components is compromised, the trusted agent will disconnect the node from the network. The trusted agent may be built on the Trusted Platform Module specified by the Trusted Computing Group, which is integrated into many laptop computers and may also be installed into smaller devices such as mobile phones, or may be built on another platform that may provide functionality as described above. The trusted agent may include both a software component and a hardware component; the hardware component may be, for example, integrated into the motherboard of a computing device.

Figure 2:
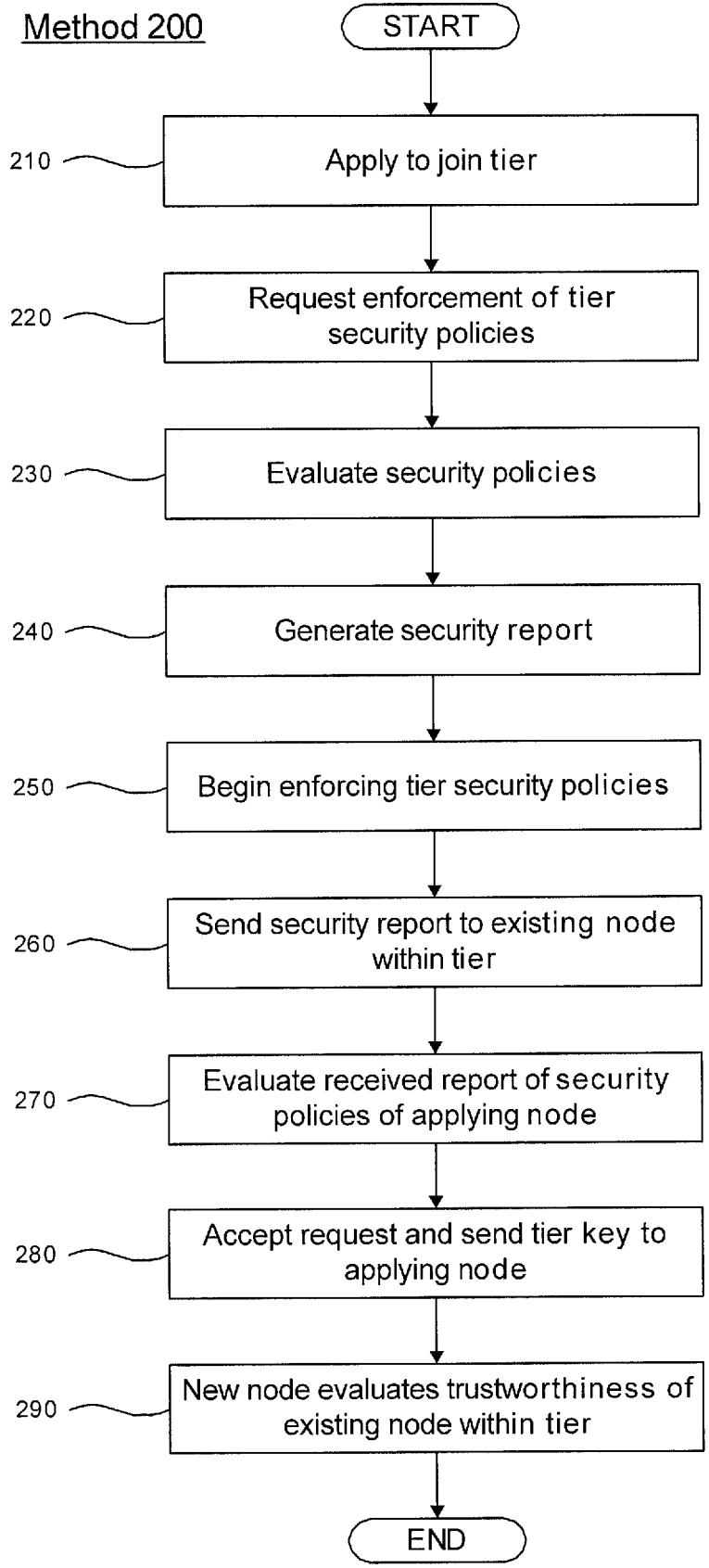
FIG. 2 shows an exemplary method for adding a node to a trusted tier in a mobile ad hoc network.

FIG. 2 illustrates an exemplary method 200 by which a node may be authenticated to join a trusted tier, as described above. The method 200 will be described with reference to the node 120 of FIG. 1 attempting to join a trusted tier of which the node 110 is already a member, though those of skill in the art will understand that these nodes are only exemplary. The method 200 comprises a number of steps to be performed by trusted agents executed by nodes 110 and 120; if, at any point, a step is executed unsuccessfully, the process terminates and node 120 is unable to join the trusted tier.

In step 210, node 120 sends a request to node 110 to join a trusted tier of which node 110 is a member. This may occur, for example, in response to a request by a user of node 120, automatically upon detection of the trusted tier by the appropriate software application being executed by node 120, etc. The request may specify the identity of the application relating to the trusted tier (e.g., IP address, port number, etc.), and may be sent by a connection appropriate to the nature of the MANET (e.g., a WLAN connection, etc.). In response, in step 220, the node 110 requests that node 120 guarantees trusted enforcement of the policy governing the trusted tier.

In step 230, node 120 evaluates the policy governing the trusted tier to determine whether it can be enforced. In step 240, node 120 invokes its trusted agent to generate a report describing its system commitment, the service commitment of its local policy enforcer, and the integrity measurement of booting. In step 250, the trusted agent of node 120 begins enforcing the requested policies, and in step 260 node 120 sends the report on its system commitment to node 110 for evaluation.

In step 270, the trusted agent of node 110 authenticates and verifies the commitments and attestation provided by node 120. This includes verifying the system commitment, the enforcement commitment and the boot attestation against its local trust policy before determining that node 120 may join the tier. From the boot attestation, node 110 can verify that node 120 has been booted using a system kernel including an appropriate trusted agent. Verifying the system commitment convinces node 110 that the kernel of node 120 will not load untrusted modules, which protects the trusted agent of node 120 from being tampered with. Verifying the enforcer commitment proves that the enforcer software execution stack on node 120 is trusted because the trusted agent of node 120 will enforce its commitment to prevent untrusted code from being loaded by the enforcer.

Once all three of the above verifications have been performed, in step 280 the node 110 accepts the join request sent by node 120 and sends to node 120 the tier key, which is used to authenticate communications within the tier. At the same time, node 110 sends to node 120 its own commitment report, which is substantially similar to that generated in step 240 above; in this manner, authentication may be made bi-directional. In step 290, node 120 verifies the report from node 110, as was done above in step 270. After step 290, the method terminates, and node 120 can communicate with node 110 and other nodes in the tier using the tier key.

Figure 3A:
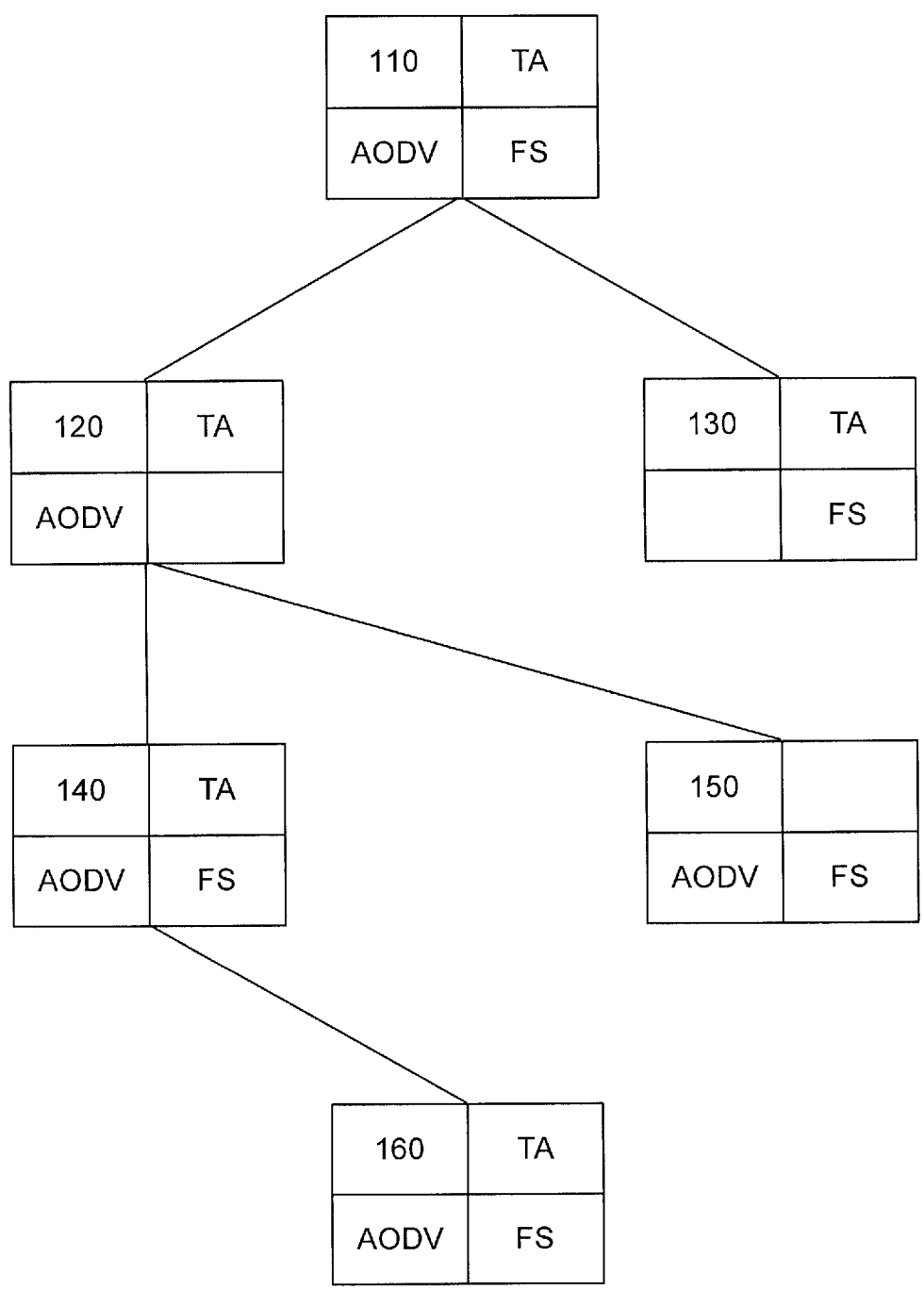
FIG. 3A shows further information about nodes within the exemplary mobile ad hoc network of FIG. 1.

FIG. 3A illustrates the system of FIG. 1, and also provides further information about each of the nodes 110-160, which will serve to illustrate why tiers may propagate as will be described below with reference to FIGS. 3B and 3C. Nodes 110, 120, 130, 140 and 160 include a trusted agent as described above, while node 150 does not. Nodes 110, 120, 140, 150 and 160 support the AODV routing protocol, while node 130 does not. Nodes 110, 130, 140, 150 and 160 share a common file sharing protocol (indicated as "FS"), while node 120 does not.

Figure 3B:
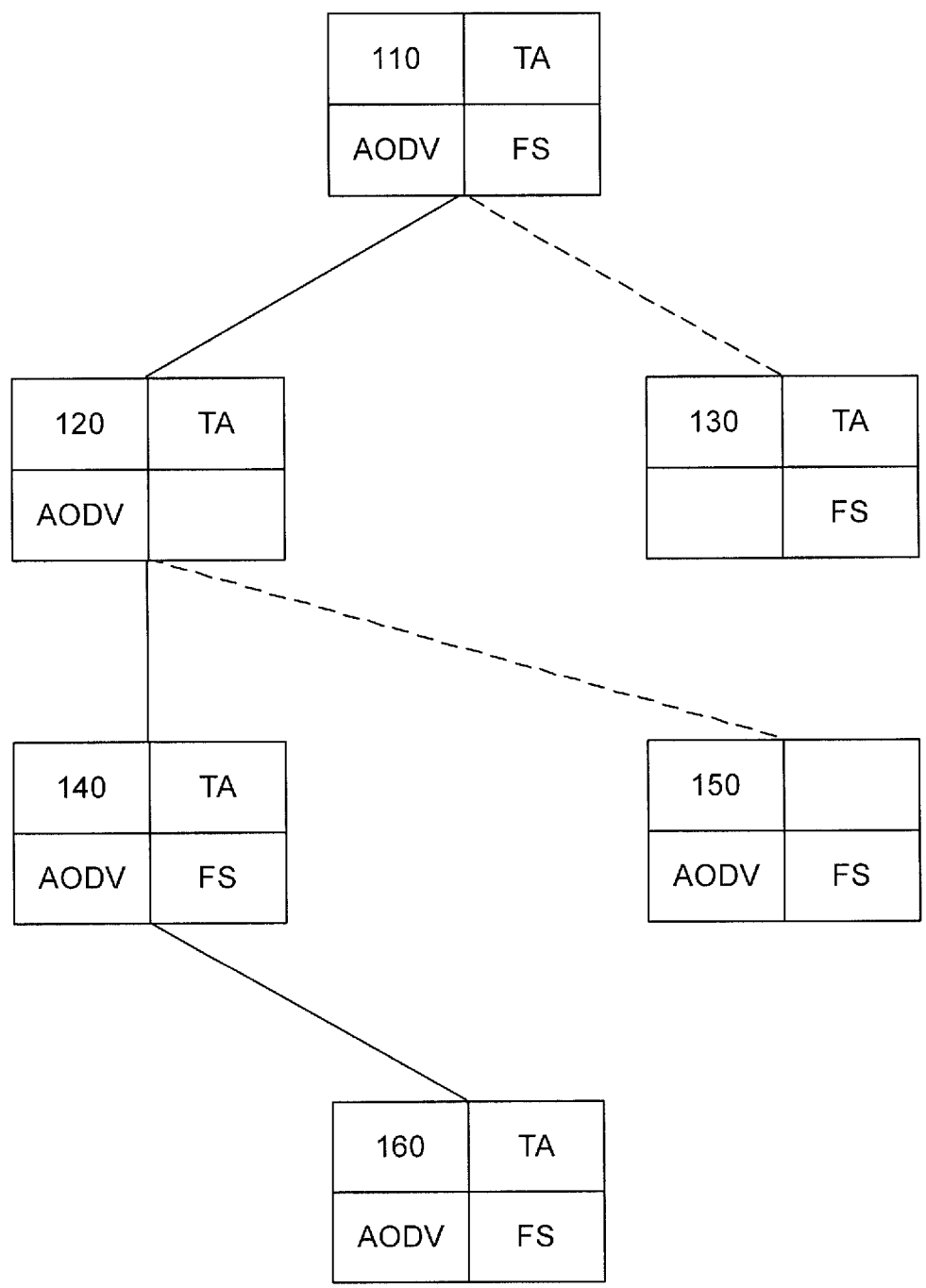
FIG. 3B shows the propagation of a first trusted tier within the mobile ad hoc network of FIGS. 1 and 3A.
Figure 3C:
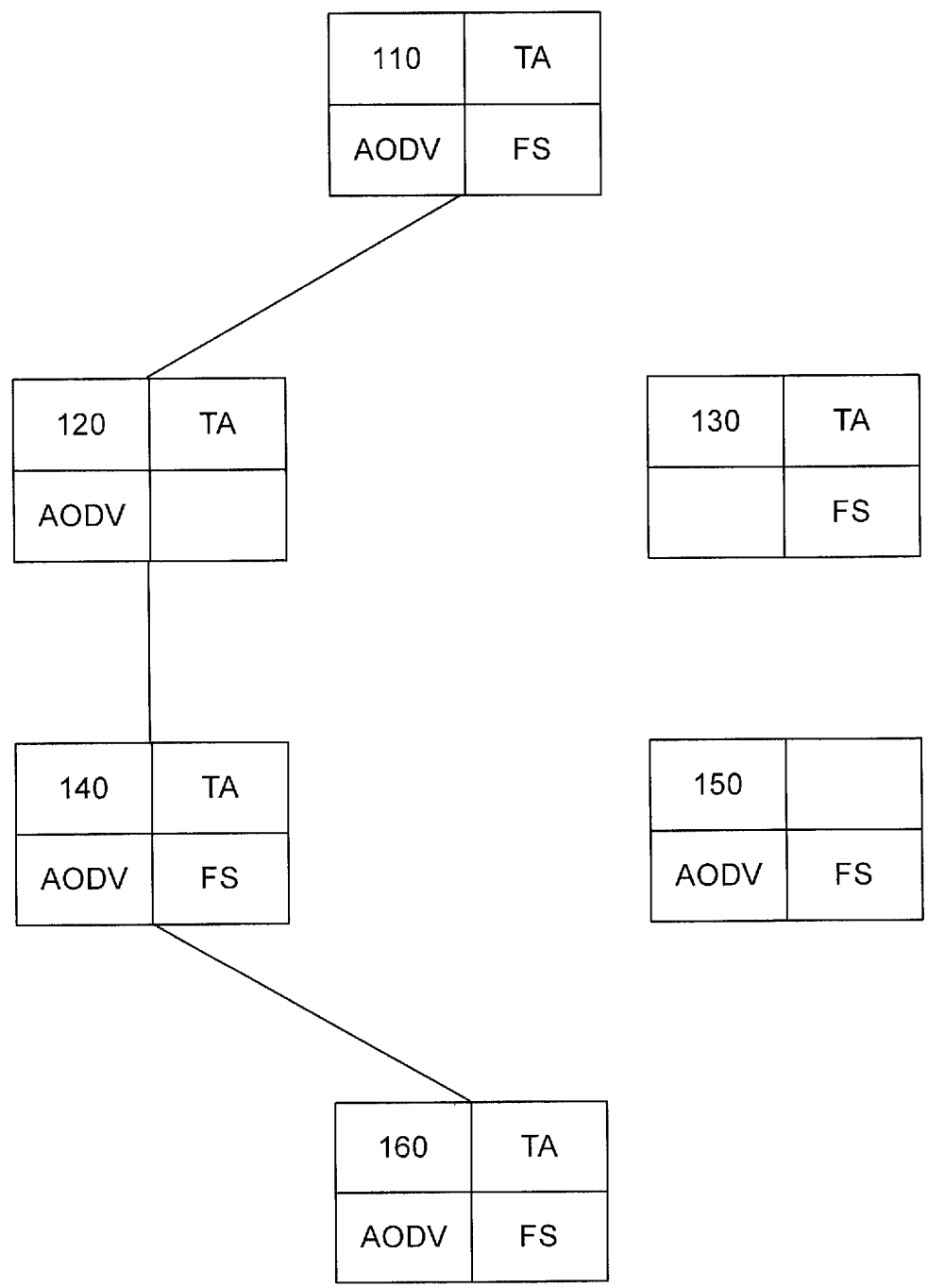
FIG. 3C shows the propagation of a second trusted tier within the mobile ad hoc network of FIGS. 1, 3A and 3B.

FIG. 3B illustrates the propagation of a routing tier beginning at node 110 and continuing through the system 110. In FIG. 3B, a solid line indicates that a path has been properly formed within the AODV routing tier, while a dashed line indicates that a path has not been formed. In the example illustrated by FIG. 3B, node 110 successfully includes node 120 in the routing tier, but node 130 is not included because it does not support the AODV protocol. Once node 120 has been added to the tier, it may invite nodes 140 and 150 to join the tier; node 140 joins successfully, while node 150 is not included because it does not include a trusted agent, which is a prerequisite for joining a trusted tier in accordance with the exemplary embodiments. Once node 140 has joined the routing tier, it invites node 160 to join, which is successfully accomplished. In each case, inviting a node to join may be accomplished in accordance with the method 200 of FIG. 2.

Once a routing tier or other supporting has been created, other tiers may be established on this basis. For example, FIG. 3C illustrates the establishment of a file-sharing tier subsequent to establishing a routing tier as described above. In this example, nodes 130 and 150 are not invited to join the file-sharing tier, because they are not members of the routing tier. Node 120 cannot join the file-sharing tier, because it lacks the file sharing protocol, but conveys the request to node 140, and subsequently to node 160, nonetheless. Because it is a member of the routing tier, it may also route packets from node 110 to nodes 140 and 160 and vice versa, including packets sent in accordance with the file-sharing tier.

Figure 4:
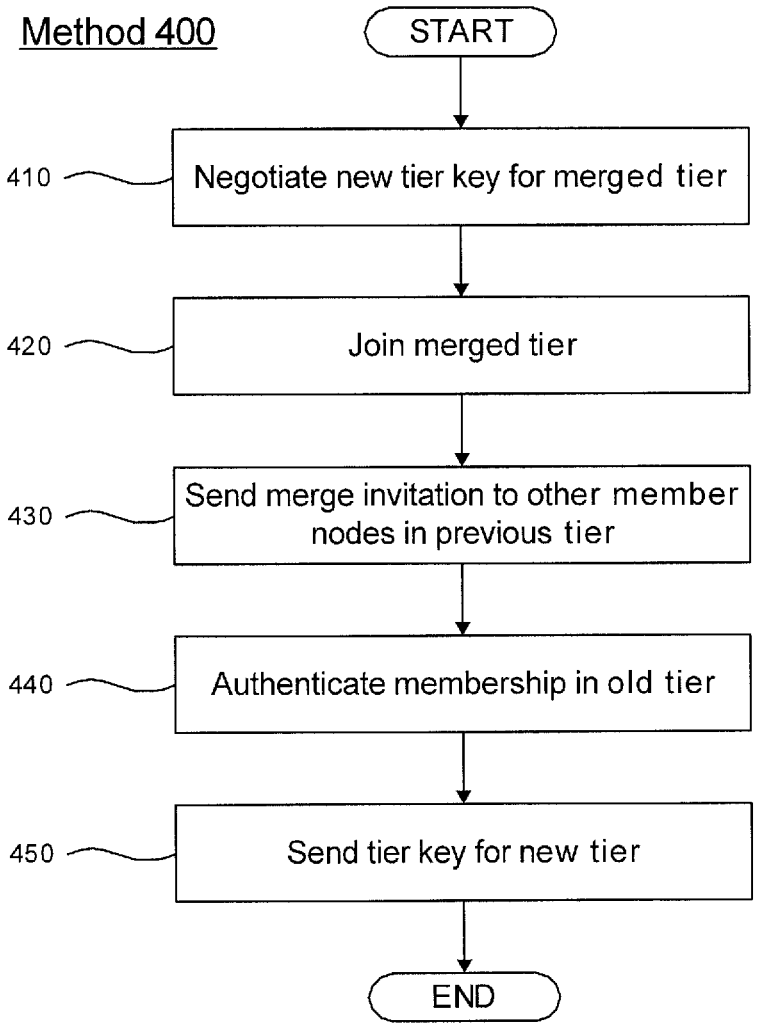
FIG. 4 shows an exemplary method for merging two trusted tiers operating under a common security policy.

FIG. 4 illustrates an exemplary method 400 by which two tiers that are operating in accordance with the same policy may be merged. This may be appropriate if, for example, two nodes running a given tier are initially unable to communicate with two other nodes running the same tier, but subsequently establish communications. For example, with reference to FIG. 3B, nodes 110 and 120 may be operating in accordance with the AODV routing tier, and nodes 140 and 160 may be operating in accordance with the same tier, but separately if nodes 120 and 140 are initially unable to communicate with one another. Thus, the method 400 will be described with reference to nodes 120 and 140 subsequently establishing communication with one another. The method 400 may begin when node 140 learns of the existence of node 120 operating the same tier nearby. For instance, node 140 may receive a message from node 120 that it cannot authenticate, potentially indicating that node 120 is running the same application with a different tier key. To verify whether node 120 is enforcing the same policy, nodes 120 and 140 exchange policies; if they are they same, one of the nodes (e.g., node 140) initiates the merging protocol described by method 400 to unify the two tiers.

In step 410, nodes 120 and 140 negotiate a new key to be used by the merged tier. In one exemplary embodiment, each of the nodes 120 and 140 computes a hash value of its own key, and the key with the greater hash value is selected as the new key. For the purpose of this example, it will be assumed that node 120's key is selected. In step 420, node 140 joins node 120's tier by the protocol described above in the exemplary method 200. Upon receiving the tier key, node 140 verifies the key against the hash received in step 410. Node 140 may also retain its old key for a period of time, in order to authenticate other member nodes of the old tier (e.g., in this example, node 160).

In step 430, node 140 sends a message to nodes in its existing tier (e.g., node 160) with a nonce, which is a number or string of bits (e.g., randomly-generated) to be used only once, inviting these nodes to join the merged tier. In step 440, node 160 receives this message, and is authenticated by exchanging a message with node 140 including a nonce and an authentication based on the tier key for the previously-existing tier including nodes 140 and 160, thereby authenticating node 160's membership in the previous tier. Subsequently, in step 450, node 140 encrypts the new tier key using the old tier key and sends it to node 160. After this step, the method 400 terminates and node 160 may function as a member of the new, merged tier.

The exemplary embodiments may provide protection against various types of attacks against a node and its trusted agent. In one example, an attacker may attempt to disable the enforcement of the tier security policy; however, because disabling the policy requires removal of the policy enforcer, the trusted agent may intercept this removal request and clear the tier key before removing the module. In another example, an attacker may attempt to modify the security policy at runtime; however, the trusted agent may secure the memory space holding the policy, such that write access to this memory space is restricted.

In another example, an attacker may attempt to steal the tier key, but this may not be possible because the tier key is stored only in a secured area of memory accessible only to the trusted agent and not written to disk. In another example of an attack, an attacker may try to steal the tier key during distribution; however, the key may be encrypted during distribution using a public-private key pair that may not be accessible to an attacker. In a fifth example of an attack on the MANET, an attacker may attempt to replay a valid report from a node that has joined the network and use it to become a member of the network; however, this may be impossible due to the nonce included in the report, because the node receiving the report will recognize that the nonce has been duplicated, and that the report has therefore also been duplicated.

Thus, the exemplary embodiments may foil a number of common attacks and provide a high level of security for a MANET. Because security services are provided at a kernel level, it may be very difficult for attackers to tamper with the trusted agents described above, and may further insure that all security policies are complied with. In one implementation, the exemplary embodiments may achieve a mean latency of 1150 ms to add a node to a trusted tier, 180 ms to merge two trusted tiers, and 0.15 ms to enforce a policy within a trusted tier. Most significantly, security is enforced bi-directionally at each node when it joins the tier or when it connects to another node that is joining the tier, thereby enabling uniform enforcement of security policies throughout the MANET without requiring trusted choke points to be available as in infrastructure networks.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium storing a set of instructions executable by a processor, the set of instructions performing a method comprising:
   receiving, by a first node, a request from a second node to join a trusted ad hoc network;
   authenticating the second node to join the trusted ad hoc network, the authentication performed based on a verification that the second node will comply with a security policy of the trusted ad hoc network, wherein the verification comprises verifying a system commitment of the second node to the security policy, verifying an enforcer commitment of the second node to the security policy, and verifying a boot status of the second node;

sending, to the second node, a first report indicating that the first node complies with the security policy;

adding the second node to the trusted ad hoc network;

sending, to the second node, a key corresponding to the trusted ad hoc network;

receiving a module from the second node;

upon detection of an attempt to disable the security policy from the module, clearing the key corresponding to the trusted ad hoc network and removing the module.

2. The non-transitory computer readable storage medium of claim 1, wherein the verification is performed by verifying a second report generated by a trusted agent operated by the second node.

3. The non-transitory computer readable storage medium of claim 2, wherein the trusted agent includes a hardware component and a software component.

4. The non-transitory computer readable storage medium of claim 3, wherein the software component of the trusted agent operates as a portion of a kernel of an operating system of the second node.

5. The non-transitory computer readable storage medium of claim 1, wherein the trusted ad hoc network comprises a plurality of security policies.

6. The non-transitory computer readable storage medium of claim 5, wherein each of the plurality of security policies corresponds to an application executed by a plurality of nodes of the trusted ad hoc network.

7. The non-transitory computer readable storage medium of claim 1, wherein the method further comprises
selecting, as a final key for the trusted ad hoc network, one of an initial key of the trusted ad hoc network and a key of a further trusted ad hoc network, the second node being a member of the further trusted ad hoc network.

8. The non-transitory computer readable storage medium 7, wherein the selection is made based on a higher one of a hash value of the initial key of the trusted ad hoc network and a hash value of the key of the further trusted ad hoc network.

9. The non-transitory computer readable storage medium of claim 7, wherein the method further comprises:
inviting a further node of the further trusted ad hoc network to join the trusted ad hoc network; and
adding the further node to the trusted ad hoc network, based on a verification of a membership of the further node in the further trusted ad hoc network.

10. The non-transitory computer readable storage medium of claim 1, further comprising:
determining whether a further trusted ad hoc network complies with the security policy;
if the further trusted ad hoc network complies with the security policy, sending an invitation to a further node of the further trusted ad hoc network;
receiving, from the further node, an authentication that the further node belongs to the further trusted ad hoc network; and
adding the further node to the trusted ad hoc network.

11. The non-transitory computer readable storage medium of claim 1, wherein the first report comprises a system commitment of the first node to the security policy, an enforcer commitment of the first node to the security policy, and a boot status of the first node.

12. A method, comprising:
Receiving, by a first node, a request from a second node to join a trusted ad hoc network;
authenticating the second node to join the trusted ad hoc network, the authentication performed based on a verification that the second node will comply with a security policy of the trusted ad hoc network, wherein the verification comprises verifying a system commitment of the second node to the security policy, verifying an enforcer commitment of the second node to the security policy, and verifying a boot status of the second node;
sending, to the second node, a first report indicating that the first node complies with the security policy;
adding the second node to the trusted ad hoc network;
sending, to the second node, a key corresponding to the trusted ad hoc network;
receiving a module from the second node;
upon detection of an attempt to disable the security policy from the module, clearing the key corresponding to the trusted ad hoc network and removing the module.

13. The method of claim 12, wherein the verification is performed by verifying a second report generated by a trusted agent operated by the second node.

14. The method of claim 13, wherein the trusted agent includes a hardware component and a software component.

15. The method of claim 14, wherein the software component of the trusted agent operates as a portion of a kernel of an operating system of the second node.

16. The method of claim 12, wherein the trusted ad hoc network comprises a plurality of security policies.

17. The method of claim 16, wherein each of the plurality of security policies corresponds to an application executed by a plurality of nodes of the trusted ad hoc network.

18. A device, comprising:
a memory; and
a processor configured to receive, by a first node, a request from a second node to join a trusted ad hoc network of which the device is a member, the processor further configured to:
authenticate the second node to join the trusted ad hoc network, the authentication performed based on a verification that the second node will comply with a security policy of the trusted ad hoc network, wherein the verification comprises verifying a system commitment of the second node to the security policy, verifying an enforcer commitment of the second node to the security policy, and verifying a boot status of the second node;
send, to the second node, a report indicating that the first node complies with the security policy;
add the second node to the trusted ad hoc network;
send, to the second node, a key corresponding to the trusted ad hoc network;
receive a module from the second node;
upon detection of an attempt to disable the security policy from the module, clear the key corresponding to the trusted ad hoc network and removing the module.

19. The method of claim 12, wherein the first report comprises a system commitment of the first node to the security policy, an enforcer commitment of the first node to the security policy, and a boot status of the first node.

* * * * *